United States Patent
Yi et al.

(10) Patent No.: US 9,369,907 B2
(45) Date of Patent: *Jun. 14, 2016

(54) METHOD OF PERFORMING A MINIMIZATION OF DRIVE TEST (MDT) FOR SPECIFIC AREA IN WIRELESS COMMUNICATION SYSTEM

(71) Applicant: LG ELECTRONICS INC., Seoul (KR)

(72) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,518

(22) Filed: May 12, 2014

(65) Prior Publication Data

US 2014/0248842 A1    Sep. 4, 2014

Related U.S. Application Data

(63) Continuation of application No. 13/014,650, filed on Jan. 26, 2011, now Pat. No. 8,768,335.

(60) Provisional application No. 61/298,873, filed on Jan. 27, 2010.

(30) Foreign Application Priority Data

Jan. 26, 2011  (KR) .................. 10-2011-0007695

(51) Int. Cl.
*H04W 36/00*    (2009.01)
*H04W 24/10*    (2009.01)

(52) U.S. Cl.
CPC .................................... *H04W 24/10* (2013.01)

(58) Field of Classification Search
USPC ............... 455/418–423, 432.1, 436–453, 455/67.11–67.7; 370/329–334
See application file for complete search history.

(56) References Cited

U.S. PATENT DOCUMENTS

2004/0203863 A1*  10/2004  Huomo ............... H04W 4/02
455/456.1
2005/0251363 A1   11/2005  Turner et al.
(Continued)

FOREIGN PATENT DOCUMENTS

CN      101420711      4/2009
KR    1020090040102    4/2009
(Continued)

OTHER PUBLICATIONS

Russian Federation Federal Service for Intellectual Property, Patents and Trademarks Application Serial No. 2012126537107, Office Action dated Oct. 29, 2013, 5 pages.
(Continued)

*Primary Examiner* — Dai A Phuong
(74) *Attorney, Agent, or Firm* — Lee, Hong, Degerman, Kang & Walmey; Jonathan Kang; Michael Monaco (57) ABSTRACT

Disclosed is a wireless communication system and terminal for providing a wireless communication service, and more particularly, a method of effectively perform an operation of MDT (Minimization Driving Test) for a specific area or a specific cell in an Evolved Universal Mobile Telecommunications System (E-UMTS) evolved from a UMTS, Long Term Evolution (LTE) System or LTE-Advanced (LTE-A) system.

8 Claims, 4 Drawing Sheets

(56) References Cited

U.S. PATENT DOCUMENTS

| | | | |
|---|---|---|---|
| 2006/0128371 A1 | 6/2006 | Dillon et al. | |
| 2007/0254717 A1* | 11/2007 | Yahagi | 455/562.1 |
| 2008/0039094 A1* | 2/2008 | Jeong | H04W 76/02 455/436 |
| 2008/0056198 A1* | 3/2008 | Charpentier | H04W 24/10 370/332 |
| 2008/0132224 A1* | 6/2008 | Gallagher | H04W 8/04 455/422.1 |
| 2008/0318571 A1* | 12/2008 | Vikberg et al. | 455/435.2 |
| 2009/0005102 A1* | 1/2009 | Das | H04W 52/241 455/522 |
| 2009/0075648 A1 | 3/2009 | Reed et al. | |
| 2009/0104905 A1* | 4/2009 | DiGirolamo et al. | 455/434 |
| 2010/0041412 A1* | 2/2010 | Yu | 455/450 |
| 2010/0062792 A1* | 3/2010 | Han | H04W 64/00 455/456.2 |
| 2010/0184434 A1* | 7/2010 | Jeong | H04W 36/0083 455/435.2 |
| 2010/0184454 A1 | 7/2010 | Luft et al. | |
| 2010/0195566 A1 | 8/2010 | Krishnamurthy et al. | |
| 2010/0227628 A1* | 9/2010 | Anderson et al. | 455/456.3 |
| 2010/0304748 A1 | 12/2010 | Henttonen et al. | |
| 2010/0311421 A1* | 12/2010 | Mach | H04W 48/16 455/436 |
| 2011/0014921 A1* | 1/2011 | Neil | H04W 48/08 455/444 |
| 2011/0045827 A1* | 2/2011 | Choi | 455/432.1 |
| 2011/0092214 A1* | 4/2011 | Iwamura | 455/438 |
| 2011/0149907 A1* | 6/2011 | Olsson | H04W 36/0022 370/331 |
| 2011/0183663 A1* | 7/2011 | Kenehan | H04W 76/048 455/423 |
| 2012/0015646 A1 | 1/2012 | Burbidge et al. | |
| 2012/0015681 A1 | 1/2012 | Dalsgaard et al. | |
| 2013/0010630 A1 | 1/2013 | Jeong et al. | |

FOREIGN PATENT DOCUMENTS

| | | |
|---|---|---|
| RU | 2008-118351 | 11/2009 |
| WO | 2007/047145 | 4/2007 |

OTHER PUBLICATIONS

Russian Federation Federal Service for Intellectual Property, Patents and Trademarks Application Serial No. 2012126537/07, Office Action dated Apr. 25, 2014, 8 pages.

Orange, et al., "MDT Measurement Model," 3GPP TSG-RAN WG2 Meeting #68bis, R2-100239, Jan. 2010, 3 pages.

The State Intellectual Property Office of the People's Republic of China Application Serial No. 201180005254.7, Office Action dated Jun. 10, 2014, 6 pages.

\* cited by examiner

METHOD OF PERFORMING A MINIMIZATION OF DRIVE TEST (MDT) FOR SPECIFIC AREA IN WIRELESS COMMUNICATION SYSTEM

CROSS-REFERENCE TO RELATED APPLICATIONS

This application is a continuation of U.S. patent application Ser. No. 13/014,650, filed on Jan. 26, 2011, now U.S. Pat. No. 8,768,335, which claims the benefit of earlier filing date and right of priority to Korean Application No. 10-2011-0007695, filed on Jan. 26, 2011, and also claims the benefit of U.S. Provisional Application No. 61/298,873, filed on Jan. 27, 2010, the contents of which are all hereby incorporated by reference herein in their entirety.

TECHNICAL FIELD

The present invention relates to a wireless communication system and terminal for providing a wireless communication service, and more particularly, a method of performing a minimization of drive test (MDT) for specific area(s), in an Evolved Universal Mobile Telecommunications System (E-UMTS) evolved from a UMTS, Long Term Evolution (LTE) System or LTE-Advanced (LTE-A) system.

BACKGROUND ART

Figure 1:
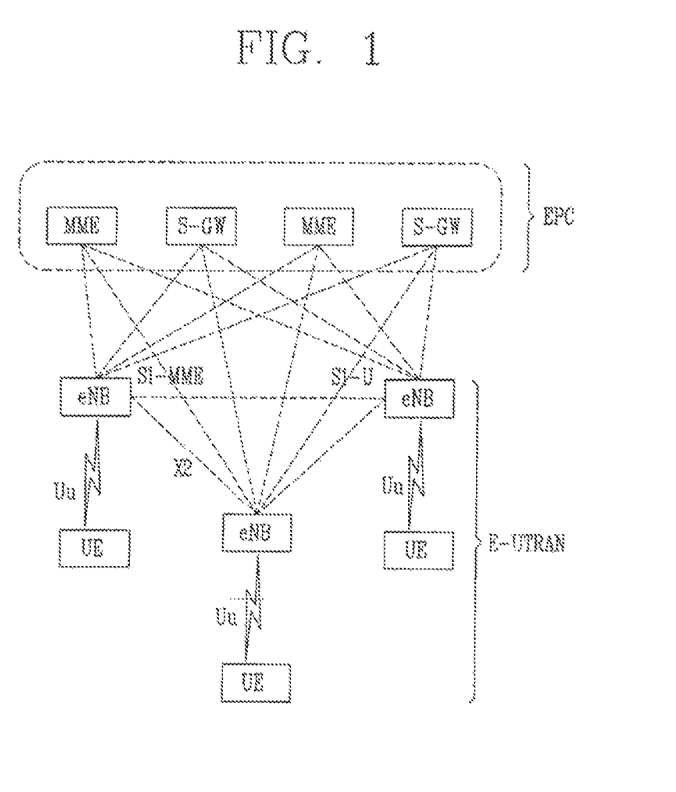
FIG. 1 is a network architecture of E-UTRAN as a mobile communication system to which the related art and the present invention are applied.

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

Figure 2:
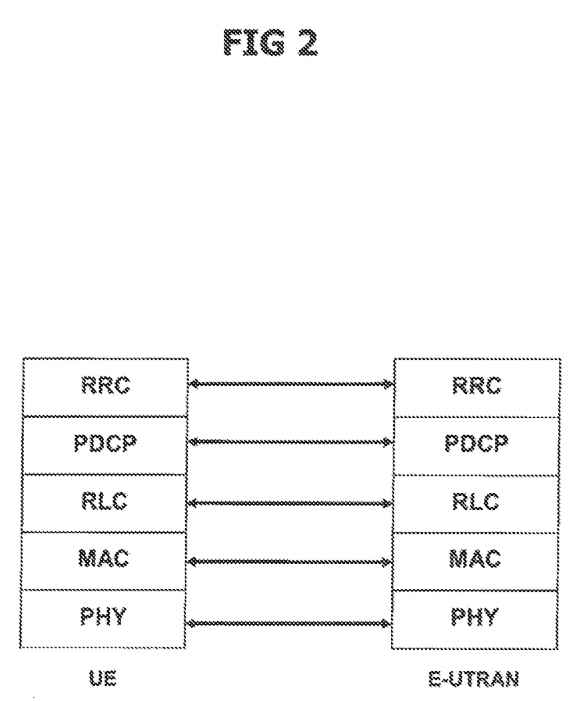
FIG. 2 is an exemplary view illustrating a control plane architecture in a radio interface protocol between UE and E-UTRAN.
Figure 3:
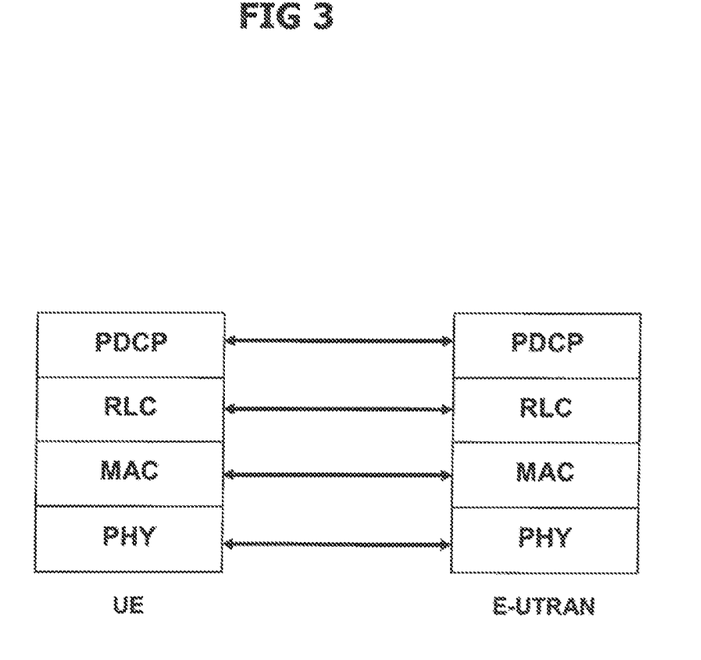
FIG. 3 is an exemplary view illustrating a user plane architecture in a radio interface protocol between UE and E-UTRAN.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Interconnection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjusts a data size such that a lower layer can send data to a radio section. Also, the RLC layer provides three operation modes such as a transparent mode (TM), an unacknowledged mode (UM) and an acknowledged mode (AM) so as to guarantee various quality of services (QoS) required by each radio bearer (RB). In particular, AM RLC performs a retransmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

Hereinafter, an RRC mode and an RRC connection method of UE will be described in detail. The RRC mode refers to whether or not the RRC of the UE is logically connected to the RRC of an E-UTRAN. If connected, then it is called an RRC_CONNECTED mode, and otherwise it is called an RRC_IDLE mode. For the UE in an RRC_CONNECTED mode, the E-UTRAN can recognize the existence of the relevant UE in a cell unit because there exist an RRC connection thereof, and thus the E-UTRAN can effectively control the UE. On the contrary, for the UE in RRC_IDLE mode, the E-UTRAN cannot recognize the relevant UE, and therefore, it is managed by a core network in a tracking area unit, which is a unit larger than a cell. In other words, the existence of the UE in an RRC_IDLE mode is only recognized in a large area unit, and therefore, it should be changed to an RRC_CONNECTED mode in order to receive typical mobile communication services such as voice or data.

When the UE is initially turned on by a user, the UE first searches for a suitable cell and then is camped in an RRC_IDLE mode in the corresponding cell. The UE camped in an RRC_IDLE mode makes an RRC connection with the RRC of the E-UTRAN through an RRC connection procedure when it is required to make an RRC connection, thereby changing the state to an RRC_CONNECTED mode. There are several cases when the UE in an idle mode is required to make an RRC connection. For example, an uplink data transmission may be required due to a phone call attempt by the user, or the like, or the transmission of a response message may be required in response to a paging message received from the E-UTRAN.

Hereinafter, Minimization Driving Test (MDT) will be described. A principal purpose of MDT is to change a test, which was executed using an actual vehicle by the existing operators, into an efficient scheme, in order to ensure cell coverage optimization. That is, one scheme is to detect a coverage hole. Coverage depends on a construction of a new base station or building or a user's usage environment. Thus, an operator must periodically execute a driving test, which causes consumption of a lot of costs and resources. MDT has a concept of using users' terminals instead of actual coverage measurement by the operators.

DISCLOSURE

Technical Problem

In general, in order to optimize a cell coverage, it is necessary to perform a MDT measurement in a RRC idle mode of a terminal because a terminal is camped on a cell in a RRC idle mode. To do this, a network must set a measurement configuration to specific terminal that should perform a logged MDT in the RRC idle mode. Further, a method for reporting the MDT measurement log stored in the RRC idle mode must be proposed. Here, if the terminal always performs a MDT measurement (i.e., logged MDT) whenever the terminal is in the RRC idle mode, it may cause an unnecessary battery (or memory) consumption of the terminal due to an unnecessary MDT measurement log. Further, if the terminal performs a MDT measurement (i.e., logged MDT) with respect to all measurement configurations, which set by the network, it may also cause an unnecessary battery (or memory) consumption of the terminal since some of MDT measurement (i.e., logged MDT) may not be interested by a service provider.

Technical Solution

Therefore, an object of the present invention is to provide a method for performing a logged MDT (Minimization Driving Test) for specific area(s) in a radio communication system more effectively than in the related art.

To achieve the object of the present invention in accordance with one embodiment, there is provided a method of performing a measurement in wireless communication system, the method comprising: receiving a measurement configuration from a network, wherein the measurement configuration includes area information indicating one or more specific cells that should perform a measurement logging; storing the received measurement configuration; receiving system information from the network, wherein the system information includes a cell identifier; and performing the measurement logging if the cell indicated by the cell identifier of the system information is included within an area indicated by the area information of the measurement configuration.

Also, to achieve the object of the present invention in accordance with one embodiment, there is provided A method performing a measurement in wireless communication system, the method comprising: receiving a measurement configuration from a network in a RRC connected mode, wherein the measurement configuration is used to perform a measurement logging in a RRC idle mode, wherein the measurement configuration is received through a dedicated RRC message; performing the measurement logging in the RRC idle mode using the received measurement configuration; and reporting a logged measurement result to the network in the RRC connected mode.

Further, to achieve the object of the present invention in accordance with one embodiment, there is provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network, wherein the measurement configuration includes area information indicating one or more specific cells that should perform a measurement logging; storing the received measurement configuration; receiving system information from the network, wherein the system information includes a cell identifier; and performing the measurement logging if the cell indicated by the cell identifier of the system information is included within an area indicated by the area information of the measurement configuration.

Further, to achieve the object of the present invention in accordance with one embodiment, there is provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network in a RRC connected mode, wherein the measurement configuration is used to perform a measurement logging in a RRC idle mode, wherein the measurement configuration is received through a dedicated RRC message; performing the measurement logging in the RRC idle mode using the received measurement configuration; and reporting a logged measurement result to the network in the RRC connected mode.

MODE FOR INVENTION

One aspect of this disclosure relates to the recognition by the present inventors about the problems of the related art as described above, and further explained hereafter. Based upon this recognition, the features of this disclosure have been developed.

The present invention is applied to 3GPP communication technologies, especially, to communication apparatuses and methods in UMTS system, UTE system or UTE-A system. However, the present invention may not be limited to this communication type, but applicable to any wired/wireless communication complying with the scope of the present invention.

Hereinafter, description will be given of the configurations and operations of the preferred embodiment according to the present invention with reference to the accompanying drawings.

Hereinafter, a Minimization Driving Test (MDT) will be described. A principal purpose of MDT is to change a test, which was executed using an actual vehicle by the existing operators, into an efficient scheme, in order to ensure coverage optimization. That is, one scheme is to detect a coverage hole. Coverage depends on a construction of a new base station or building or a user's usage environment. Thus, an operator must periodically execute a driving test, which causes consumption of a lot of costs and resources. The MDT has a concept of using users' terminals instead of actual coverage measurement by the operators.

The Minimization Driving Test (MDT) may be divided into a logged MDT and an immediate MDT. The logged MDT is that, after performing the MDT measurement, the terminal stores (or logs) a measurement result and then transmits the logged MDT to a network (e.g., eNB) at particular time (or particular time period). The immediate MDT is that, after performing the MDT measurement, the terminal immediately transmits a measurement result to the network without storing the measurement result in a storage of the terminal. As described above, the difference between the logged MDT and the immediate MDT is that whether the measurement result is stored (or logged) or not. Here, if the terminal is in a RRC idle mode, the logged MDT may be used because the terminal cannot transmit the measurement result immediately in the RRC idle mode.

In general, a measuring value for the MDT is a quality of a cell that the terminal camped on. The measuring value may be measured as a reference signal received power (RSRP) and a reference signal received quality (RSRQ). If the logged MDT is set or configured, the terminal may measure the quality of cell in the RRC idle mode, and may store (or log) the measured quality of cell. Thereafter, the terminal may report the measured quality of cell (i.e., logged MDT, MDT measurement result) to a network. After receiving the MDT measurement result from the terminal, the network may optimize a coverage of cell by adjusting or controlling a signal power of the cell using the received MDT measurement result.

The measurement trigger conditions for the terminal to store a log are divided into a period-based method and an event trigger-based method. The event trigger-based method is applied when a quality of a downlink radio link measured by a terminal is lower than a specific reference value, upon transmitting a RRC message due to a radio link failure, or upon an uplink radio link access failure.

In general, the methods for storing a measurement log of a terminal include a period-based method and an event trigger-base method. The simplest method is to inform a preset time period for storing a log from a network to a terminal such that the terminal can measure its log for every preset time period so as to inform the measurement log to the network. However, if the network sets an extremely short time period, the terminal may measure an unnecessary log too many times, and if the network sets an extremely long time period, a radio environment may become very bad before the log measurement after the time period. In this case, such information may not be terminal log information at an actually usable time point.

On the contrary to the period-based method, the event trigger-based method is configured such that a terminal measures its log when a preset condition is met. Compared with the period-based method, the event trigger-based method measures the log only when the log measurement of the terminal is actually needed, so the efficient log measurement may be allowed without an unnecessary measurement of the terminal log. The event trigger-based methods may include a method of measuring a terminal log by checking a radio quality of a downlink radio link of the terminal, and a method for measuring a terminal log by checking a radio quality of an uplink radio link of the terminal. If the terminal is present in the CELL_PCH or URA_PCH mode, the terminal has no data to send in uplink, so the terminal must measure the terminal log after checking the radio quality of the downlink radio link. The measurement of a terminal log after checking the radio quality of the downlink radio link may be performed in two cases, namely, at a time point of transmitting RRC reestablishment after radio link failure (RLF), and when the downlink radio link quality of a serving cell is lower than a specific threshold value.

As mentioned above, one of the event trigger conditions for storing a measurement log by the terminal is to measure the terminal log upon RRC reestablishment due to a radio link failure (RLF). Here, the terminal recognizes the RLF through the following processes. That is, if the terminal receives a specific number of out-of-sync or more from a physical layer for a preset time period so as to be informed that a radio quality of a downlink radio link is not in a good condition, the terminal determines that the downlink radio link has a problem. Afterwards, if the problem of the radio link is solved within a preset time, namely, if the terminal consecutively receives a specific number of in-sync or more from the physical layer within a preset time period so as to be informed that the radio quality of the downlink radio link becomes good, the terminal determines that the problem of the radio link has been solved. If the terminal does not receive the specific number of In-sync within the preset time, the terminal determines that the radio link was failed, namely, RLF has occurred. Accordingly, the terminal releases all the pre-allocated radio resources and changes into the IDLE mode, thereby retrieving an appropriate cell again.

In the present disclosure, the following method is proposed to perform a logged MDT in a RRC idle mode more effectively.

First, a network (e.g., eNB) may select specific terminal(s) that should perform a logged MDT in a RRC idle mode. Here, the specific terminal(s) may be selected from those terminals in a RRC connected mode. After selecting the specific terminals, a measurement configuration (or measurement configuration message) for the logged MDT may be transmitted to the specific terminal(s) by using a dedicated RRC message. Here, the measurement configuration message may be transmitted through a separate RRC message or may be transmitted through a RRC connection release message.

The measurement configuration message may include area information or a region identifier (ID) that identifies a specific area (or cell) where the logged MDT should be performed by the terminal. Here, the area information or the region ID may be in various different format, for example, 1) Cell identifier: an identifier of a single cell, 2) List of cell identifiers: a list of a plurality of cell IDs, 3) Cell group identifier, 4) Tracking area identifier, etc.

The measurement configuration message may further include following information as well, for example, 1) information indicating what to measure—RSRP (Reference Signal Received Power), RSRQ (Reference Signal Received Quality), CQI (Channel Quality Indicator), RSSI (Received Signal Strength Indicator), etc, 2) information indicating when to log the measurement result-specific time(s) or specific condition(s) to log the measurement result.

In a RRC connected mode, after receiving the measurement configuration message from a network, a terminal (UE) may store the value(s) or information of the measurement configuration message into a storage (i.e., memory, buffer) of the terminal.

Thereafter, when the terminal changes its state into a RRC idle mode, the terminal may camp on a suitable cell based on a radio quality or a frequency priority order, and then may check whether the cell that the terminal camped on is included in a cell identified by the area information or the regional ID. Here, the above checking step may be executed whenever the terminal performs a cell selection or a cell reselection in the RRC idle mode. Further, the above checking step may be perform by comparing the stored area information (or regional ID) of the measurement configuration message with a regional ID broadcasted by system information from the network.

After the checking step, if it is determined that the region ID of the system information is matched with the stored area information (or stored region ID), the terminal may proceed to perform the MDT measurement in the RRC idle mode, and may store (or log) a measurement result. However, if it is determined that the region ID of the system information is not matched with the stored area information (or stored region ID), the terminal may suspend to perform the MDT measurement.

Thereafter, when the terminal changes its state to the RRC connected mode, the terminal may transmit the MDT measurement result to the network. Here, the MDT measurement result may be transmitted to the network through a dedicated RRC message. The MDT measurement result may include a plurality of different logged measurement result for various cells or areas. Therefore, the MDT measurement result may also include an area ID (or cell ID or region ID) in order to identify its area ID from other different areas.

Figure 4:
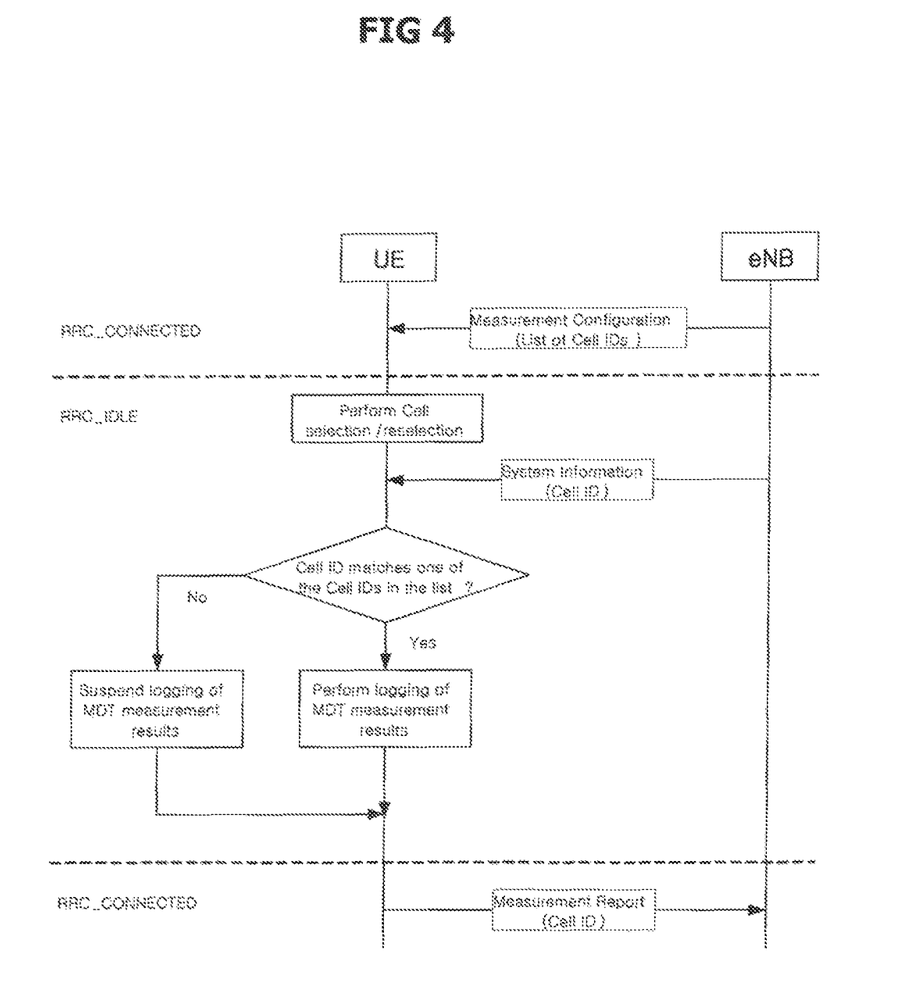
FIG. 4 is an exemplary view illustrating a procedure for performing a logged MDT (Minimization Driving Test) in accordance with the present invention.

FIG. 4 is an exemplary view illustrating a procedure for performing a logged MDT (Minimization Driving Test) in accordance with the present invention.

As illustrated in FIG. 4, a terminal (UE) may receive a measurement configuration (or a measurement configuration message) from a network (e.g., eNB) in a RRC connected mode. Here, the measurement configuration message may include a list of cell identifiers (IDs). Here, each of the cell identifiers may identify specific cell that should perform a MDT measurement (or a logged MDT). Further, the measurement configuration message may include information related to the list of cell IDs. Thereafter, the received measurement configuration may be stored in a storage unit (e.g., memory, buffer) of the terminal.

Thereafter, when the terminal changes its state to a RRC Idle mode, the terminal may camp on a suitable cell (by means of performing a cell selection/reselection or receiving paging) and may obtain a cell ID (or an area ID) by receiving system information. Thereafter, the terminal may compare the cell ID of the system information with the list of cell IDs stored in the storage unit. If the one of the cell IDs in the list matches with the cell ID of the system information, the terminal may perform an operation of logged MDT, and may log a measurement result after performing the logged MDT. If none of the cell IDs in the list matches with the cell ID of the system information, the terminal may not perform the operation of logged MDT. (i.e., suspend an operation of the MDT measurement)

Thereafter, when the terminal changes its state to the RRC connected mode, the terminal may transmit a measurement report, which includes the logged measurement result in the RRC idle mode, to the network. Here, the measurement report may be transmitted to the network through a dedicated RRC message. Further, the measurement report may include a plurality of different logged measurement result for various cells or areas, and each of the logged measurement result may includes a corresponded cell ID (or area ID) in order to identify its cell ID from other different cells.

As described above, a MDT (Minimization of Drive Test) is a new feature introduced in a LTE/UMTS system to facilitate automating the collection of terminal (UE) measurements to minimize the need of manual drive-tests. According to the present invention, it is possible for the terminal (UE) to perform MDT measurement in idle mode, which is referred to a logged MDT.

The present invention proposes a mechanism to configure a specific idle mode terminal (UE) to perform a MDT measurement in a specific area. Specifically, when the terminal (UE) is connected to a cell, it receives a measurement configuration by a dedicated RRC message from a network (eNB), and stores the measurement configuration information in a storage unit (e.g., memory, buffer) of the terminal. Here, the measurement configuration message may include area information or a region identifier that indicates a specific area where the MDT measurement should be performed. Here, the area information or the region identifier may be in the form of a tracking area identifier, a cell identifier, a list of cell identifier, or a cell group identifier. Further, the measurement configuration message may also include a measurement triggering condition (i.e., when to measure) When the measurement triggering condition is met, the terminal may perform a MDT measurement and store results of the MDT measurement in the storage unit. (i.e., MDT logging) or the terminal may store the results of the MDT measurement that are available at that point of time. Further, the measurement configuration message may also include information indicating what to measure. Here, the measurement configuration message may be transmitted through a separate RRC message or within a RRC connection release message. In RRC idle mode, if the terminal is in a same region as indicated by the area information or the region identifier, the terminal may perform the MDT measurement and may log the result of the MDT measurement when the triggering condition of the measurement trigger is met, or the terminal may log available MDT measurement results when the triggering condition of the measurement log trigger is met. However, in RRC idle mode, if the terminal is in a different region as indicated by the area information or the region identifier, the terminal may stop performing the MDT measurement and may stop log the results of the MDT measurement, or the terminal may stop logging of available MDT measurement results. The situation when the terminal is in the different region as indicated by the area information or the region identifier may occur when the terminal is going out of the specific region or when the terminal power-off in the specific region and power-on in the different region. The terminal may find whether or not it is in the same region as indicated by the area information or the region identifier by comparing a region identifier received from the measurement configuration message (i.e. stored in the UE) with a region identifier broadcasted from the network. In each cell, the network may broadcast the region identifier that the cell belongs to in the system information. Here, the terminal may perform the region identifier comparison when it selects a new cell. If the two region identifiers are matched, the terminal may consider that it is in the same region, and may keep performing the MDT measurement and logging or logging the available MDT measurement results. If the two regions Identifier do not match, the terminal may consider that it moves to the different region, and may stop performing the MDT measurement and logging or logging available MDT measurement results. Thereafter, when the terminal is connected to the network, the terminal may report the logged measurement results by a dedicated RRC message (i.e. measurement report message) to the network. If the network is different from the network that sends the measurement configuration message, then the terminal may include the region identifier for which the measurement results are logged in the measurement report message. If the network is the same network that sends the measurement configuration message, then the terminal may send the measurement report message without including the region identifier for which the measurement results are logged. Here, the region identifier may be broadcasted by a network in the system information or a network in the measurement configuration message or a terminal in the measurement report message.

The present invention may provide a method of performing a measurement in wireless communication system, the method comprising: receiving a measurement configuration from a network, wherein the measurement configuration includes area information indicating one or more specific cells that should perform a measurement logging; storing the received measurement configuration; receiving system information from the network, wherein the system information includes a cell identifier; performing the measurement logging if the cell indicated by the cell identifier of the system information is included within an area indicated by the area information of the measurement configuration, reporting a logged measurement result to the network, wherein the area information is related to at least one of a cell identifier, a list of cell identifiers, a cell group identifier, and a tracking area identifier, the measurement logging is suspended if the cell indicated by the cell identifier of the system information is not included within an area indicated by the area information of the measurement configuration, the logged measurement result includes a region identifier indicating a specific area that the measurement logging has been performed, the measurement configuration is a minimization driving test (MDT) configuration, the determination of whether the cell indicated by the cell identifier of the system information is included within the area indicated by the area information of the measurement configuration is performed when a terminal is camped on a new cell.

It can be also said that a method performing a measurement in wireless communication system, the method comprising: receiving a measurement configuration from a network in a RRC connected mode, wherein the measurement configuration is used to perform a measurement logging in a RRC idle mode, wherein the measurement configuration is received through a dedicated RRC message; performing the measurement logging in the RRC idle mode using the received measurement configuration; and reporting a logged measurement result to the network in the RRC connected mode, wherein the measurement configuration is a minimization driving test (MDT) configuration, the measurement configuration indicates a triggering condition of the measurement logging.

The present invention may further provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network, wherein the measurement configuration includes area information indicating one or more specific cells that should perform a measurement logging; storing the received measurement configuration; receiving system information from the network, wherein the system information includes a cell identifier; performing the measurement logging if the cell indicated by the cell identifier of the system information is included within an area indicated by the area information of the measurement configuration, wherein the measurement configuration is a minimization driving test (MDT) configuration.

Also, the present invention may provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network in a RRC connected mode, wherein the measurement configuration is used to perform a measurement logging in a RRC idle mode, wherein the measurement configuration is received through a dedicated RRC message; performing the measurement logging in the RRC idle mode using the received measurement configuration; and reporting a logged measurement result to the network in the RRC connected mode, wherein the measurement configuration is a minimization driving test (MDT) configuration.

Hereinafter, a terminal in accordance with the present invention will be described.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Effect of the Invention

The present invention provides a method can efficiently perform an operation of MDT (Minimization Driving Test) in a wireless communication system. According to the present invention, a terminal can perform a logged MDT for only specific area (i.e, a specific cell). Unlike the related art, since the terminal only performs the operations of MDT for the specific area, unnecessary battery consumption and a memory storage can be prevented.

What is claimed is:

1. A method for performing a measurement in wireless communication system, the method comprising:
   receiving, from a network by a User Equipment (UE) in a Radio Resource Control (RRC) mode, the UE being selected by the network, a RRC message that includes a measurement configuration that includes area related information for the measurement, the area information indicating an area within which measurement logging is requested;
   after receiving the measurement configuration, receiving, by the UE from the network, system information that includes cell related information for the measurement, the cell related information including one or more cell identifiers IDs, when the UE camping on the one or more cell;
   performing, by the UE in a RRC idle mode, a measurement logging according to a comparison between the area related information included in the measurement configuration and the cell related information included in the system information,
   wherein the measurement logging is performed when a cell identifier indicated by the cell related information is included within the area indicated by the area related information and matching with the one or more cell IDs included within the system information, and
   wherein the measurement logging is not performed when the cell identifier indicated by the cell related information is included within the area indicated by the area related information and is not matched with the one or more cell IDs included within the system information; and
   reporting, to the network by the UE in an RRC connected mode, the measurement logging including the cell identifier matching with the one or more cell IDs included within the system information.

2. The method of claim 1, wherein the measurement configuration is a minimization driving test (MDT) configuration.

3. The method of claim 1, wherein the measurement configuration indicates a triggering condition of the measurement logging.

4. The method of claim 1, wherein the area related information is a cell identity list.

5. A User Equipment (UE) for performing a measurement in wireless communication system, the UE comprising:
   a transceiver to transmit or receive a data;
   a memory to store the data; and
   a processor configured to cooperate with the transceiver and the memory to:
      receive, from a network while in a Radio Resource Control (RRC) mode, the UE being selected by the network, a RRC message that includes a measurement configuration that includes area related information for the measurement, the area information indicating an area within which measurement logging is requested;
      after receiving the measurement configuration, receive, from the network, system information that includes cell related information for the measurement, the cell related information including one or more cell identifiers IDs, when the UE camping on the one or more cell;
      while in a RRC idle mode, perform a measurement logging according to a comparison between the area related information included in the measurement configuration and the cell related information included in the system information,
      wherein the measurement logging is performed when a cell identifier indicated by the cell related information is included within the area indicated by the area related information and matching with the one or more cell IDs included within the system information, and
      wherein the measurement logging is not performed when the cell identifier indicated by the cell related information is included within the area indicated by the area related information and is not matched with the one or more cell IDs included within the system information; and
      when in an RRC connected mode, report, to the network, the measurement logging including the cell identifier matching with the one or more cell IDs included within the system information.

6. The UE of claim 5, wherein the measurement configuration is a minimization driving test (MDT) configuration.

7. The UE of claim 5, wherein the measurement configuration indicates a triggering condition for logging the measurement.

8. The UE of claim 5, wherein the area related information is a cell identity list.

* * * * *